Patented Mar. 13, 1928.

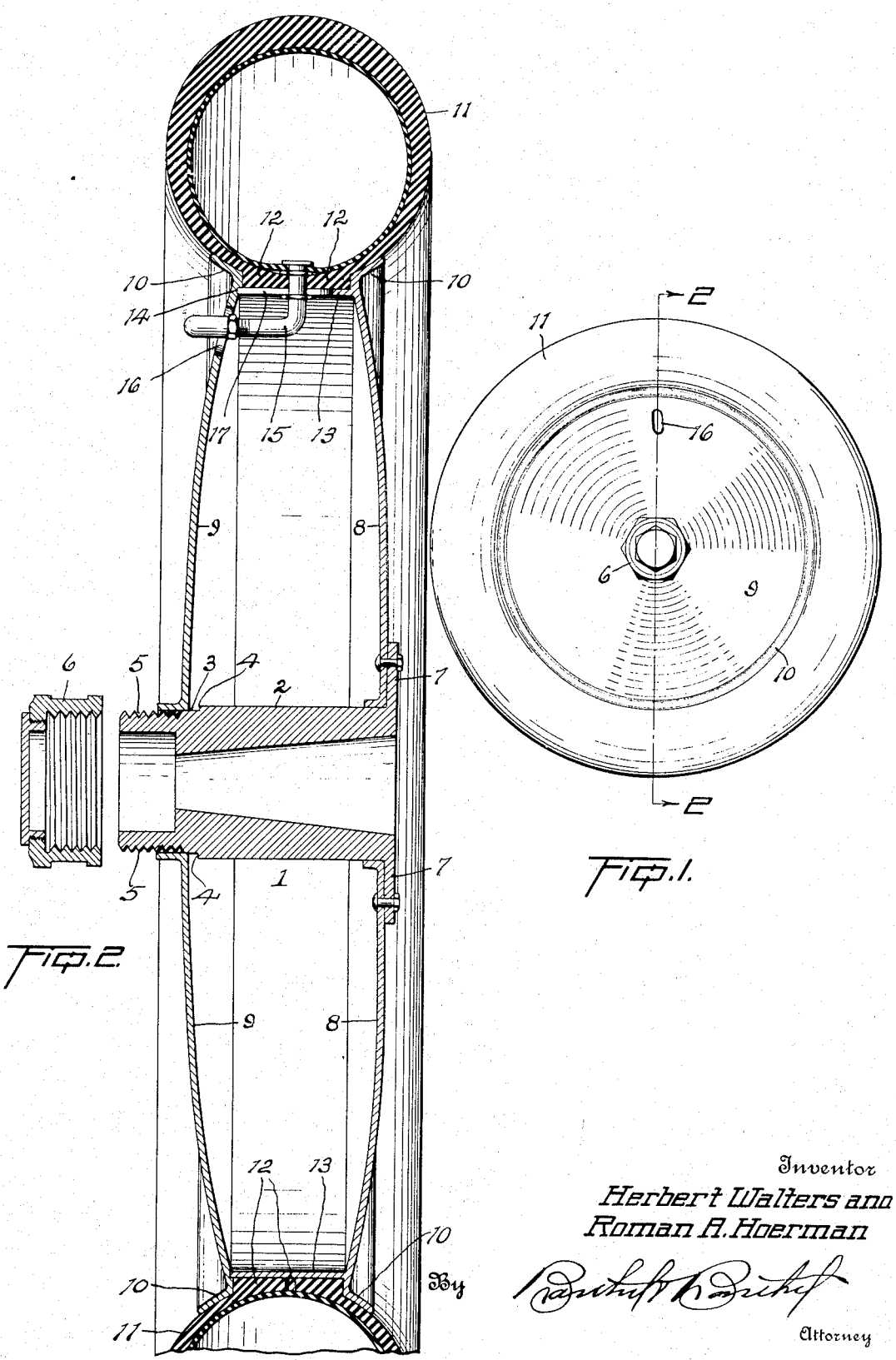

1,662,622

UNITED STATES PATENT OFFICE.

HERBERT WALTERS AND ROMAN A. HOERMAN, OF DETROIT, MICHIGAN.

DISK WHEEL.

Application filed May 16, 1927. Serial No. 191,902.

This invention relates to vehicle wheels and more particularly to wheels of the disk type upon which tires of a pneumatic or other type are adapted to be detachably mounted. An object of the invention is to provide a very simple and strong construction particularly adapted for heavy loads and to withstand great lateral strains and arrange to facilitate the mounting of a tire thereon and its removal therefrom. A further object is the securing in place of the tire and detachable tire holding wheel member, by means of a single member applied to the wheel hub and arranged to place the web or disk portion of the wheel under compression by the securing of the tire and tire holding member in place on the hub.

With the above and other objects in view, the invention consists in providing a wheel web for connecting the hub and rim, one side of which is made detachable for the purpose of releasing the tire and which side member is held in place by a single securing member detachably applied to the hub and arranged to force said side member inwardly on the hub toward the opposite web member and place said web members under a yielding strain. The invention further consists in providing a double disk wheel in which the rim portion for the mounting of a tire directly thereon is formed integral with the peripheries of the disks with one rim portion of one disk unconnected with the rim portion of the other disk, whereby one side of the tire holding rim is removable with its disk and a demounting of the disk releases the tire. The invention also consists in providing a wheel of simple construction which is cheap to manufacture and has a minimum number of parts, and which construction embodies certain other new and useful features, all as hereinafter described and more particularly pointed out in the appended claims, reference being had to the accompanying drawing in which Figure 1 is a side elevation of a wheel illustrative of an embodiment of the invention; and Fig. 2 is an enlarged section substantially upon the line II—II of Fig. 1.

In Fig. 2 of the drawing, a conventional form of hub 1 is shown, but it will be understood that this construction of hub may be modified to suit the construction and arrangement of the axle parts to which the hub is to be applied, but preferably such hub will be formed with a portion 2 having an exterior cylindrical configuration, the outer end portion 3 of which is reduced in diameter to form an annular shoulder 4 with the outer end of its reduced portion exteriorly screw-threaded as at 5 to receive a cap or nut 6. The inner end of the hub may be formed with a radial flange 7, as shown or provided with other suitable means for the attachment thereto of a disk 8 forming one side of the web portion of the wheel extending from hub to rim. A second or outer disk 9 is provided to form the outer side of the wheel web and this disk has an axle flanged opening of a diameter to fit the reduced outer end portion 3 of the hub.

Each of the disks 8 and 9 is formed at its periphery with an outwardly and laterally extending tire engaging flange 10 to conform to the curvature of the tire 11 adjacent its beads 12, and the disk 8, inwardly a short distance from its flange 10, is formed with an integral annular flange 13 extending laterally from the disk toward the outer disk 9, and said outer disk is formed with an annular groove 14 to receive the end edge of this flange 13 when the two disks are in place on the hub. The flange 13 thus forms the bottom of a channel in which the tire beads 12 are seated and this flange together with the side flanges 10 form a suitable tire rim which is an integral part of the two disks, the disk 9 and its flange 10 being, however, unconnected or secured to the disk 8 and its flange 13 so that by removing the disk 9, the flange 10 forming one side of the channel rim for the tire, is also removed and the tire may be quickly and easily slipped laterally from the flange 13.

In mounting the tire on the wheel, it is slipped laterally into place upon the flange 13, and the disk 9 is then sleeved upon the reduced end portion of the hub, the flange 10 of said disk being thus brought into engagement with the tire bead to lock the tire in place upon the rim portion of the wheel, and with the end of the flange 13 entered in its annular groove 14. The nut 6 is then screwed upon the end of the hub and brought into contact with the disk 9 thereby springing this disk, or moving the central portion thereof inwardly along the hub until it seats against the shoulder 4 on the hub. The screwing on of the nut 6 thus puts a tension or strain in the disks 8 and 9, because said disks are both outwardly dished or curved inwardly toward each other from the hub toward their peripheries. The disk 9 being thus forced toward the disk 8 while its peripheral portion is in contact with the annular flange 13 on the disk 8 tends to flatten at both of the disks and they are therefore put under a strain between the encircling tire and the hub which strain will rigidly hold them in place and give a lateral bracing to the wheel for resisting heavy lateral strains thereon. A wheel is therefore provided which offers great resistance to lateral pressure and the oppositely curved and opposed disks afford great strength in carrying the load.

The tire, when a pneumatic tire such as shown, is mounted upon a wheel, is provided with a valve stem 15 bent laterally intermediate its ends so that its outer end projects through a slot or opening 16 formed in the outer disk 9 and a slot 17 is cut inwardly from the free edge of the flange 13 to receive this stem. When the tire is mounted on the flange 13 the stem is thus permitted to slip into this slot and when the outer disk 9 is applied it is positioned so that the stem 15 will project through the opening 16.

With this construction and arrangement a minimum number of wheel parts is provided and a quick release of the tire is effected by simply unscrewing the single nut which holds the disk 9 in place on the hub, and by forming the flange 13, as a part of the disk 8, or a part rigidly attached thereto, a channel rim is provided for the tire and the tire is firmly clamped within this channel by the securing of the disk 9 in place. The flange 13 by its engagement with the peripheral portion of the disk 9 forms a bridge or spacer between the peripheral portions of the two disks and therefore when the nut 6 is turned up, the disk 9 is forced at its center toward the inner disk and thus puts a strain or tension in both disks, with this inward movement of the outer disk limited by the shoulder 4 on the hub so that when the nut is firmly turned up a very strong and rigid wheel structure is secured.

What we claim is:—

1. A wheel including a hub, a disk movable longitudinally of the hub and having an annular groove adjacent its periphery, a disk fixed on the hub and spaced from the movable disk, a laterally extending integral annular flange on the fixed disk adjacent its periphery to detachably engage at its free edge within said annular groove in the movable disk and peripherally space the disks apart, said flange and peripheral portion of said disks forming a channel rim to receive a tire, and means on the hub for moving the movable disk toward the fixed disk and securing the same to the hub.

2. A wheel as characterized in claim 1, and wherein said hub is formed with a shoulder to be engaged by the movable disk and limit its movement at the hub toward the fixed disk.

3. A wheel as characterized in claim 1, and wherein said hub is screwthreaded at its outer end and said means for moving the movable disk toward the fixed disk is in the form of a nut screwed upon the screwthreaded end of the hub.

In testimony whereof we affix our signatures.

HERBERT WALTERS.
ROMAN A. HOERMAN.